UNITED STATES PATENT OFFICE.

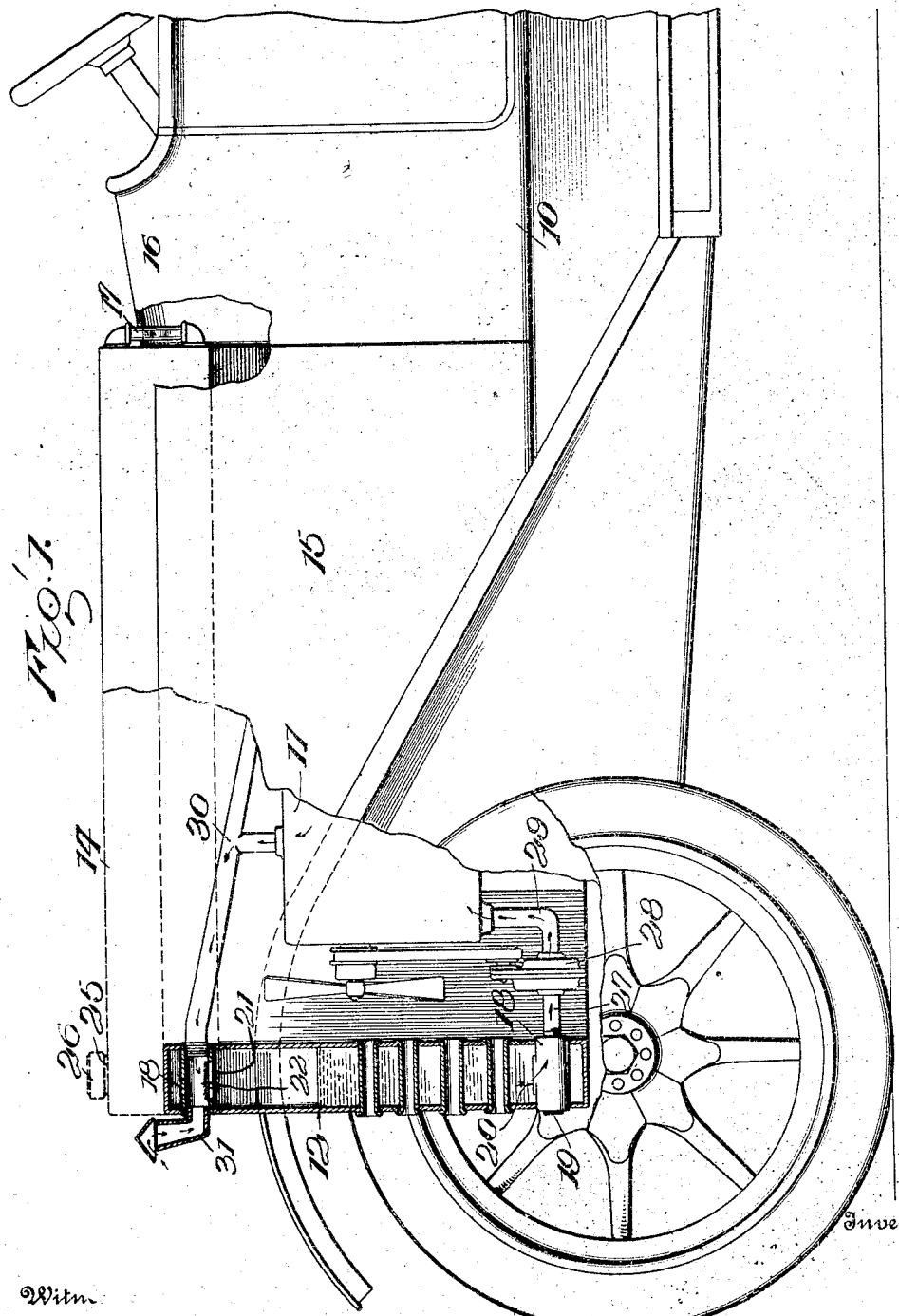

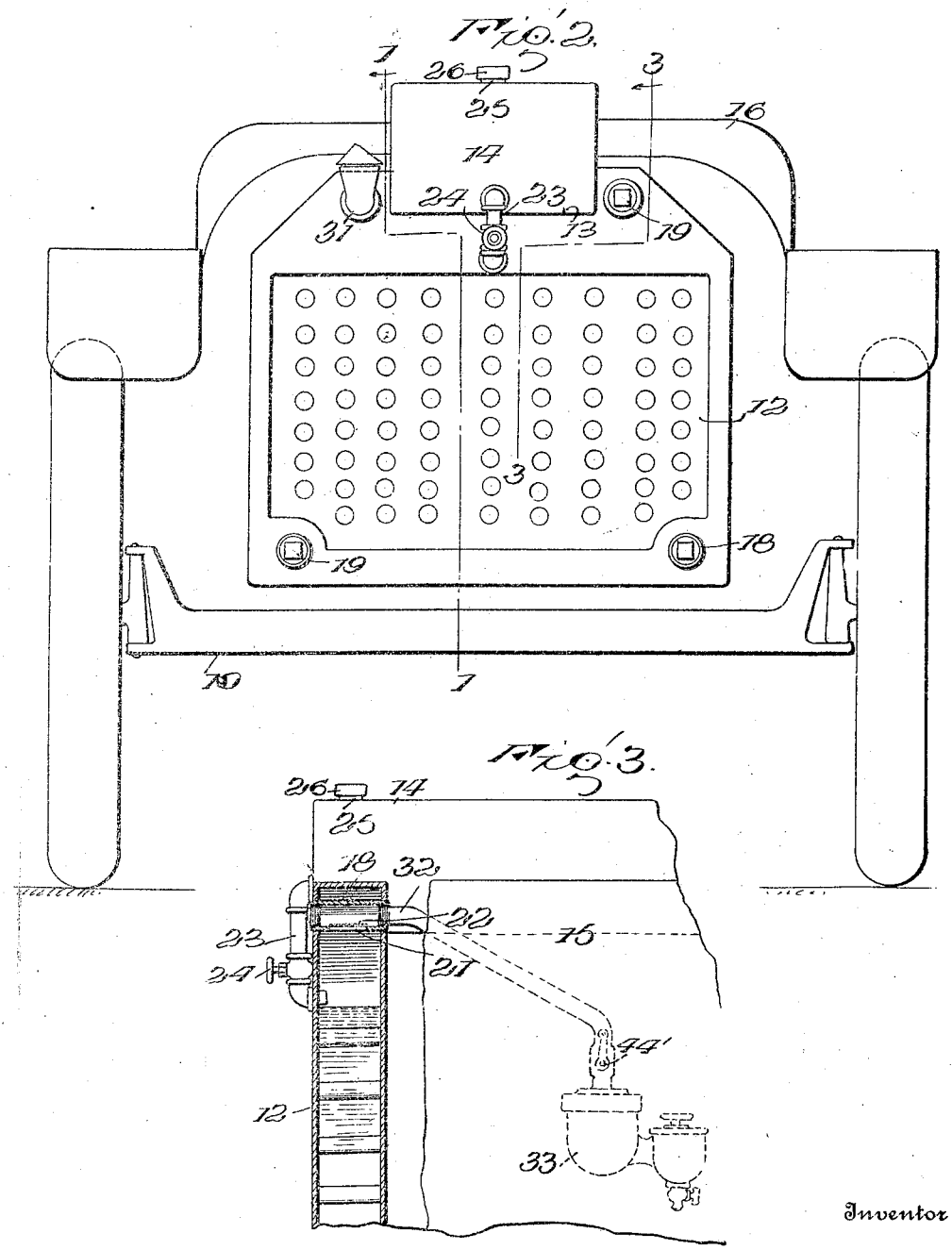

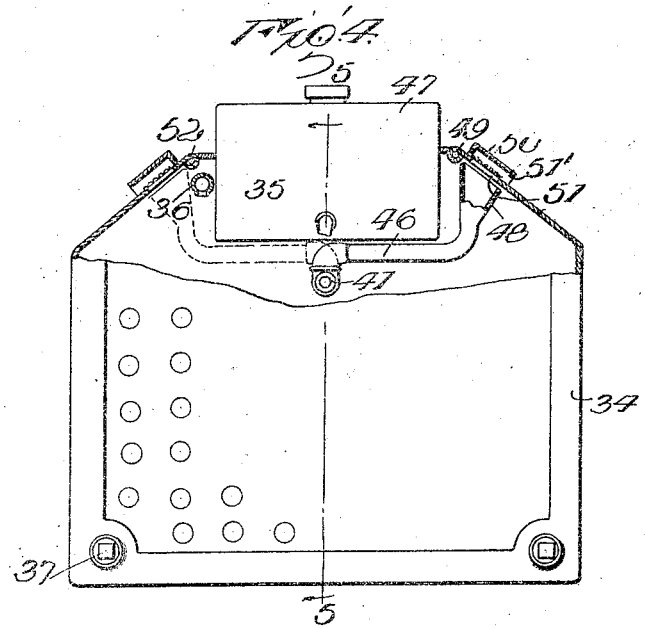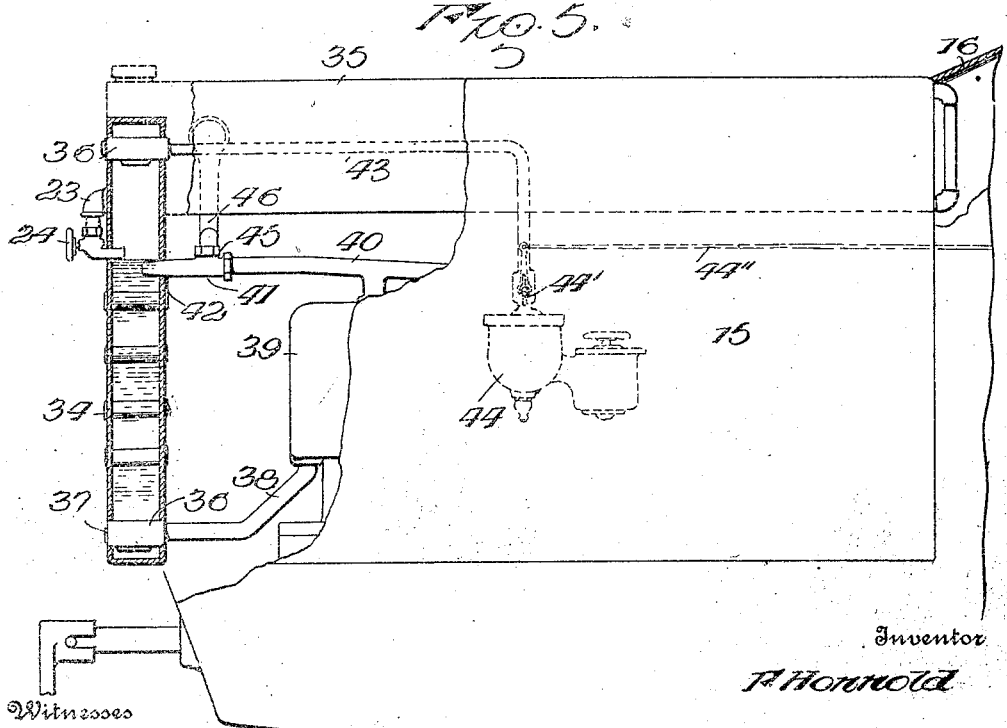

FRANK HONNOLD, OF LUTON, IOWA, ASSIGNOR OF ONE-FOURTH TO LEONARD L. HARRIS, OF HUBBARD, NEBRASKA.

COMBINED FUEL AND COOLING SYSTEM FOR VEHICLE-ENGINES.

1,156,780.   Specification of Letters Patent.   Patented Oct. 12, 1915.

Application filed July 13, 1914. Serial No. 850,777.

*To all whom it may concern:*

Be it known that I, FRANK HONNOLD, citizen of the United States, residing at Luton, in the county of Woodbury and State of Iowa, have invented certain new and useful Improvements in Combined Fuel and Cooling Systems for Vehicle-Engines, of which the following is a specification.

My present invention relates to new and useful improvements in self-propelled vehicles, the primary object of my invention being the provision of combined fuel supply and cooling systems for internal combustion engines of self-propelled vehicles.

More specifically, the primary object of my invention consists in utilizing the liquid fuel, which is to be consumed by the engine, as the cooling fluid, whereby the necessity of carrying a comparatively large quantity of water, which is otherwise useless, is avoided. Another advantage possessed by combining the fuel and cooling systems resides in the fact that while the liquid fuel is employed in cooling the engine, it absorbs such heat from the engine as to permit more complete vaporization and consequently to increase its value as fuel, in some cases this action being so pronounced that no carbureter is necessary.

A further object of my invention consists in the provision of a fuel tank extending longitudinally of the hood of the vehicle, directly over the engine, and connected by a level controlled outlet pipe with the radiator, this connection being such as to constantly maintain the level of the fuel in the radiator at a predetermined point.

Broadly speaking, pipes are led from the upper and lower portions of the radiator to the cooling jackets of the engine, in the usual way, while means is provided for supplying air to the radiator and for drawing such air from the radiator to the carbureter or the cylinders of the engine, as the case may be.

A further object of my invention is to provide structures so arranged that my improved combination of fuel and cooling systems may be utilized with engines and radiators of the ordinary type, with practically no structural changes, irrespective of whether the original cooling system of the motor was of the siphon or forced feed type.

A still further object of my invention is to so arrange the parts that the combined system may be applied to vehicles now in use, either of the right or left hand drive type and irrespective of which side of the engine the carbureter may be located.

With these and other objects in view, my invention will be more fully described, illustrated in the accompanying drawings and then specifically pointed out in the claims which are attached to and form a part of this application.

In the drawings: Figure 1 is a fragmentary side elevational view of a conventional form of self-propelled vehicle, the radiator being shown in section on the line 1—1 of Fig. 2; Fig. 2 is a front elevation of the vehicle shown in Fig. 1; Fig. 3 is a fragmentary sectional view taken on the line 3—3 of Fig. 2; Fig. 4 is a front elevational view of a slightly modified form of structure, part of the radiator being broken away to show certain details of construction and an alternate position of the air supply pipe being shown in dotted lines; Fig. 5 is a section taken on the line 5—5 of Fig. 4, looking in the direction of the arrows.

Corresponding and like parts are referred to in the following description and indicated in all the views of the drawings by the same reference characters.

In order to insure a clear, full and accurate understanding of my invention, I have illustrated it in connection with a self-propelled vehicle 10 having a multiple cylinder gas engine 11 of the usual or any preferred type and a radiator 12 which is also substantially conventional in construction, a few slight changes, which will be hereinafter explained, being made. The upper portion of the radiator is cut-away centrally as shown at 13 to receive the forward end of a liquid containing tank 14 which extends longitudinally of the vehicle, directly over the engine 11, in effect forming a portion of the hood 15. The rear end of this tank extends to the cowl dash 16 of the vehicle and is provided with a sight gage 17 opening into its upper and lower portions and readable at the dash, as shown in Fig. 1. This tank is adapted to receive the liquid fuel which, in the present invention, also constitutes the cooling liquid for the engine jackets.

A plurality of tubular coupling members 18 extend through the front and rear walls of the radiator, one adjacent each lower corner thereof and one adjacent each of the sides of the tank 14, a plurality of plug caps 19 being provided for closing the otherwise open ends of these couplings. The two lower couplings are provided in their upper faces and interiorly of the radiator with openings 20, while the two upper couplings are provided in their lower faces with openings 21 covered by screens 22 of wire gauze or other suitable foraminous material. These upper tubular couplings 18 are located above the normal liquid level of the radiator, as best shown in Figs. 1 and 3 of the drawings. Liquid is supplied to the radiator from the tank 14 through a pipe 23 leading from the lower portion of the tank into the radiator immediately below the upper couplings 18, this pipe being located in front of the radiator in order that its cut-off valve 24 may be readily accessible.

The tank 14 is provided with a filling spout 25 through which it may be filled, having a threaded closure cap 26 permitting air tight sealing of the tank 14 after filling. In order to fill the tank 14, this cap is removed, the valve 24 is closed, and the kerosene, gasolene or other liquid fuel employed is poured into the tank 14 in the same manner in which it is ordinarily poured into the customary fuel tank of the vehicle. When the tank 14 has been filled, the cap 26 is applied and the valve 24 opened to permit a portion of the fuel to flow through the pipe 23 and fill the radiator until it reaches such a level as to close the lower end of the pipe 23, air passing through this pipe into the tank 14 to replace the liquid drawn therefrom. It will of course be obvious that as soon as the lower end of the pipe 23 is closed by liquid in the radiator, no more air can pass to the tank 14 and the flow of liquid will be automatically cut off. As soon, however, as the level of liquid in the radiator falls below such a point, due to its withdrawal as fuel and also to any possible evaporation or leakage, air can again pass into the tank 14 and permit flow of additional fluid from such tank to the radiator. By this arrangement, a constant level of liquid can be maintained in the radiator as long as any liquid remains in the tank 14.

Under normal conditions, the outer ends of both the lower tubular couplings 18 and of one of the upper tubular couplings are closed by the plugs 19. Furthermore, the inner end of one of the lower tubular couplings is also closed by such a plug. A pipe 27 leads from the inner end of the other lower coupling to the pump 28 of the cooling system, this pump being driven in any suitable manner and a pipe 29 leads from this pump to the cooling jackets of the engine cylinders. A pipe 30 leads from the upper portions of the cooling jackets of these cylinders to that one of the tubular couplings 18 which is open at its forward end. A funnel shaped air intake member 31 is threaded or otherwise secured in the outer end of such coupling member 18. A pipe 32 leads from the inner end of the other upper coupling member 18 to the air intake port of a carbureter 33 which may be of any suitable type and which is usually connected to the usual gasolene fuel tank in the customary manner.

From the foregoing description, taken in connection with the drawings, the operation of my combined fuel and cooling system for internal combustion of vehicles will be readily understood. The engine is started in the customary manner by gasolene supplied to the carbureter 33, the result being that as the engine becomes heated, the gasolene, kerosene or other liquid fuel contained in the radiator, being forced through the cylinder jackets, becomes highly heated. As soon as this occurs, the air being drawn in through the member 31, meets the highly heated liquid coming from the engine cylinders through the same coupling 18 with which the member 31 communicates, the air and highly heated fuel passing through the screen 22, by which means the air becomes saturated with the fuel. This air is then drawn through the pipe 32 to the air intake valve of the carbureter 33 and so to the engine. Under these conditions, the supply of gasolene to the carbureter may be cut off and the engine subsequently driven by use of the vaporized gases from the radiator.

It will of course be clear that if gasolene is used in the tank 14 and radiator as the cooling liquid and also as the fuel, and that if an electric self-starter is supplied, it will be possible to entirely dispense with the carbureter, a manually controlled throttle valve in the pipe 32, which pipe will then lead to the intake manifold of the engine, being all that is necessary, as the self-starter will run the engine for a sufficient time to permit proper generation of an explosive mixture.

The main supply tank 14 being located directly above the engine receives considerable heat of radiation and the fuel contained therein is therefore somewhat preheated before its passage into the radiator 12.

It will of course be understood that all pipes should be formed of some metal, such that they may be somewhat flexible, as the usual rubber pipes employed in connecting the radiator to the pump 28 and to the pipes leading from the water jackets of the cylinders would soon become rotted when exposed to the action of the heated gasolene or kerosene.

From the foregoing description, it will be apparent that the structure there described can be operated only in a cooling system having a circulation pump 28 as the intake of air through the air inlet 31 is directly opposed to the return circulation of the cooling liquid through the pipe 30. In order, therefore, to adapt my system for use upon vehicles in which the cooling circulation is siphonic, I have provided a somewhat modified form of construction, illustrated in Figs. 4 and 5 of the drawings. In this form, the radiator 34 is identical in construction with the radiator, as previously described, as also is the fuel tank 35. The radiator is also provided at its upper and lower portions, and at either side, with the tubular couplings 36, the outer ends of all of these couplings in this instance, as well as the inner ends of one of the upper and one of the lower of said couplings, being closed by the threaded plugs 37. A pipe 38 leads from that lower tubular coupling 36, the inner end of which is open, to the lower portion of the cooling jackets of the engine 39, while a pipe 40 leads from the upper portions of such jackets to an inspirator nozzle 41, the discharge end of which is passed through an opening 42 formed in the rear wall of the radiator 34 immediately at the liquid level therein. A pipe 43 leads from that one of the upper coupling members 36, having its inner end open, to the air intake of the carbureter 44. The inspirator nozzle 41 is provided with an upwardly directed nipple 45 to receive one end of an L-shaped air intake pipe 46 which extends transversely beneath the fuel tank 47 and then upwardly along one side, being adapted, at its upper end, for connection with the funnel-shaped air intake member 48, corresponding to the member 31 of the form previously described. This member preferably projects up to an opening 50 formed in the hood 51 of the vehicle and, as best shown in Fig. 4 of the drawings, two such openings are formed one upon either side of the tank 35. Each of the openings 47 is covered by a screen of foraminous material 49 which in turn is protected by a cylindrical shield 50', open at its lower portion as shown at 51'. This open shield permits air to pass freely into the terminal 48 of the pipe 46 but at the same time prevents entrance of rain and snow. With this arrangement, the operation of the system is practically the same as the operation of the system first described. The liquid contained in the radiator and cooling jackets of the engine cylinders circulates through the pipe 38, cooling jackets, pipe 40 and inspirator nozzle 41 to the radiator, this circulation being facilitated by the drawing in of air through the pipe 46 and inspirator nozzle 41 to the radiator just below the liquid level therein, this air being drawn from the radiator through the pipe 43 to the intake valve of the carbureter. It will therefore be clear that, with this arrangement, the suction of the engine cylinders, in effect, forms a pump to insure circulation of the cooling liquid. In both forms of my invention, above described, a butterfly valve 44' should be located in the fuel supply pipe leading from the radiator to the carbureter in order to control the flow of gases from the radiator. This valve may be automatic in its action or may be controlled by means of a hand lever or other suitable device through the medium of a connecting rod 44''.

It will be noted at this point that in describing the form illustrated in Figs. 1 and 2, two tubular couplings were described in the lower portion of the radiator, although only one was employed. This was in order to adapt the device for use with vehicles in which the supply of cooling fluid to the cylinders might be from either the right or left hand side of the radiator. It should be also noted, in connection with this form of the invention, that the pipes 30 and 32 may be connected to whichever one of the upper tubular couplings may be most convenient, depending upon the position of the leads from the cooling jackets and upon the location of the carbureter, care however, always being taken that the air intake member 31 shall be connected to that coupling member 18 to which the pipe 30 leads. In like manner, with the form of my invention illustrated in Figs. 4 and 5 of the drawings, the pipe 38 may be led from either of the lower tubular members which shall be found more convenient, while the pipe 43 may be led from either of the upper tubular couplings. Furthermore, the air intake pipe 46 may be extended either to the right or left of the fuel tank 47 as may be found more convenient.

It will of course be clear that all air drawn in to the radiator is drawn through the heated hydrocarbon oils from the engine jacket and that such air is not only heated by this contact to facilitate the vaporization of the hydrocarbon oil but that the air being cool when drawn into the radiator greatly assists the radiator in cooling such oil.

By the means above described, my invention may be adapted for use either with forced feed or siphonic feed cooling systems, with either right or left hand drive vehicles, and with vehicles in which the carbureter is located either at the right or left hand side of the engine, with equal facility.

It will of course be understood that I do not wish to limit myself to the specific details of construction, illustrated in the drawings and described in the specification, as various changes, within the scope of the appended claims, may be made at any time, without in the slightest degree departing from the spirit of my invention.

Having thus described the invention, what is claimed as new is:

1. In a combined fuel and cooling system for internal combustion engines, the combination with an internal combustion engine having a cooling jacket, of a radiator, a fuel supply tank, means for supplying fuel from the tank to the radiator, said means automatically maintaining a predetermined level of liquid fuel in the radiator, a pipe leading from the lower part of the radiator to the lower part of the cooling jacket of the engine, a pipe leading from the upper part of the cooling jacket of the engine to the upper part of the radiator at a level below that of the fuel, means for supplying air at the point of discharge of such pipe, and a pipe leading from the radiator above the fuel level and adapted for attachment to the intake port of a carbureter.

2. A combined fuel and cooling system for internal combustion engines including a radiator, a fuel tank, means communicating between the fuel tank and radiator for maintaining a constant level of fuel in the radiator, a pipe provided with a pump adapted for communication with the cooling jacket of an engine, tubular couplings extending transversely of the radiator at either side, a plug closing the outer end of one of the couplings, a pipe leading from the inner end of said coupling and adapted for attachment to the intake port of a carbureter, the other of said couplings being provided with a screened opening intermediate its length, a pipe leading from the inner end of said latter coupling and adapted for communication with the cooling jacket of an engine, and an air intake member communicating with the outer end of said latter coupling.

3. A combined fuel and cooling system for internal combustion engines including a radiator, a fuel tank, means for supplying fuel from the tank to the radiator, said means automatically maintaining a constant level in the radiator, a pipe adapted to communicate between the lower portion of the radiator and cooling jacket of an engine, an inspirator nozzle extending into the radiator below the fuel level therein, a pipe leading from said nozzle and adapted for communicative attachment with the upper portion of the cooling jacket of the engine, an air supply pipe communicating with the inspirator nozzle intermediate its length, and a pipe communicating with the radiator above the fuel level and adapted for attachment to the intake port of a carbureter.

4. In a combined fuel supply and cooling system for internal combustion engines, the combination with an engine having a cooling jacket, of a cooling radiator, a fuel supply tank, automatic means coöperating between the tank and radiator for maintaining a predetermined liquid level in the radiator, communicating means between the radiator and cooling jacket of the engine, and a pipe leading from the radiator above the liquid level and adapted for attachment to the intake port of a carbureter.

5. In a combined fuel and cooling system for internal combustion engines, the combination with an engine having a cooling jacket, a radiator, and means establishing circulative communication between the jacket and radiator, of a fluid tight reservoir at a higher level than the radiator, a pipe leading from the reservoir to the radiator at a level at which fuel is to be maintained therein, and a fluid conducting means leading from the radiator at a point above the liquid level therein to supply fuel to the engine.

6. In a combined fuel and cooling system for internal combustion engines, the combination with an engine having a cooling jacket, a radiator, and means establishing circulative communication between the jacket and radiator, of means for automatically maintaining a predetermined level of fuel in the radiator, means for supplying air to the radiator, and means for drawing the mixed fuel vapor and air from the radiator to supply it to the engine.

7. In a combined fuel and cooling system for internal combustion engines, the combination with an engine having a cooling jacket, a radiator, and pipes establishing communication between the jacket and radiator at different levels, of means for automatically maintaining a fuel level in the radiator slightly above the level of the upper pipe, means for admitting air to the upper pipe, and means for drawing the mixed air and fuel vapor from the radiator to supply it to the engine.

8. In a combined fuel and cooling system for internal combustion engines, the combination with an engine having a cooling jacket, a radiator, and pipes establishing communication between the jacket and radiator at different levels, of means for automatically maintaining a fuel level in the radiator slightly above the level of the upper pipe, means for admitting air to the upper pipe, means for drawing the mixed air and fuel vapor from the radiator to supply it to the engine, and a throttle valve controlling such last named means.

In testimony whereof I affix my signature in presence of two witnesses.

FRANK HONNOLD. [L. S.]

Witnesses:
  O. W. Morrison,
  H. C. Le Moine.